(12) United States Patent
Kato et al.

(10) Patent No.: US 9,100,141 B2
(45) Date of Patent: Aug. 4, 2015

(54) COMMUNICATION SYSTEM AND INTERMITTENT RECEPTION METHOD

(75) Inventors: Yasuyuki Kato, Osaka (JP); Shohei Yamada, Osaka (JP); Daiichiro Nakashima, Osaka (JP); Katsunari Uemura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 255 days.

(21) Appl. No.: 13/254,737

(22) PCT Filed: Jan. 20, 2010

(86) PCT No.: PCT/JP2010/050609
§ 371 (c)(1),
(2), (4) Date: Sep. 2, 2011

(87) PCT Pub. No.: WO2010/100966
PCT Pub. Date: Sep. 10, 2010

(65) Prior Publication Data
US 2011/0317627 A1 Dec. 29, 2011

(30) Foreign Application Priority Data
Mar. 6, 2009 (JP) ................................ 2009-053799

(51) Int. Cl.
*H04L 5/00* (2006.01)
*H04W 52/02* (2009.01)

(52) U.S. Cl.
CPC .............. *H04L 5/0007* (2013.01); *H04L 5/001* (2013.01); *H04L 5/0098* (2013.01); *H04W 52/0229* (2013.01); *H04L 5/0096* (2013.01)

(58) Field of Classification Search
CPC .............................. H04L 5/007; H04L 5/0001
See application file for complete search history.

(56) References Cited

U.S. PATENT DOCUMENTS

2008/0198871 A1 8/2008 Shahidi et al.
2009/0073907 A1* 3/2009 Cai ............................... 370/311
(Continued)

FOREIGN PATENT DOCUMENTS

JP 2003-259448 A 9/2003
JP 2010-521833 A 6/2010
(Continued)

OTHER PUBLICATIONS

3GPP TS 36.211 V8.5.0, "3rd Generation Partnership Project; Technical Specification Group Radio Access Network; Evolved Universal Terrestrial Radio Access (E-UTRA); Physical Channels and Modulation", (Release 8), Dec. 2008.
(Continued)

*Primary Examiner* — Ayaz Sheikh
*Assistant Examiner* — Mariela Vidal Carpio
(74) *Attorney, Agent, or Firm* — Birch, Stewart, Kolasch & Birch, LLP

(57) ABSTRACT

An efficient discontinuous reception operation is provided for a mobile station device in Advanced-EUTRA. In a mobile station device connected to a base station device using a plurality of component carriers, during discontinuous reception, one discontinuous reception parameter is applied to all the component carriers used by the mobile station device to thereby perform the operation of monitoring a control channel in all the component carriers, and when the control channel addressed to the mobile station device is received in one or more component carriers during a reception ON period, the reception ON period is extended in all the component carriers.

6 Claims, 17 Drawing Sheets

(56) References Cited

U.S. PATENT DOCUMENTS

| | | | |
|---|---|---|---|
| 2010/0118720 A1 | 5/2010 | Gauvreau et al. | |
| 2010/0135159 A1* | 6/2010 | Chun et al. | 370/241 |
| 2011/0002281 A1* | 1/2011 | Terry et al. | 370/329 |
| 2011/0128925 A1* | 6/2011 | Lindoff et al. | 370/329 |
| 2011/0199984 A1 | 8/2011 | Umesh et al. | |
| 2011/0205928 A1* | 8/2011 | Pelletier et al. | 370/252 |
| 2011/0273996 A1* | 11/2011 | Kim et al. | 370/242 |
| 2012/0057490 A1* | 3/2012 | Park et al. | 370/252 |

FOREIGN PATENT DOCUMENTS

| | | |
|---|---|---|
| JP | 2010-537580 A | 12/2010 |
| JP | 2012-507943 A | 3/2012 |
| WO | WO 2008/054103 A1 | 5/2008 |
| WO | WO 2008/103856 A2 | 8/2008 |
| WO | WO 2009/022744 A1 | 2/2009 |
| WO | WO 2009/026549 A1 | 2/2009 |
| WO | WO 2010/051209 A1 | 5/2010 |

OTHER PUBLICATIONS

3GPP TS 36.212 V8.5.0, "3rd Generation Partnership Project; Technical Specification Group Radio Access Network; Evolved Universal Terrestrial Radio Access (E-UTRA); Multiplexing and channel coding", (Release 8), Dec. 2008.

3GPP TS 36.300 V8.7.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description", Stage 2, (Release 8), Dec. 2008.

3GPP TS 36.321 V8.4.0, "3rd Generation Partnership Project; Technical Specification Group Radio Access Network; Evolved Universal Terrestrial Radio Access (E-UTRA); Medium Access Control (MAC) protocol specification", (Release 8), Dec. 2008.

3GPP TS 36.331 V8.4.0, "3rd Generation Partnership Project; Technical Specification Group Radio Access Network; Evolved Universal Terrestrial Radio Access (E-UTRA); Radio Resource Control (RRC); Protocol specification", (Release 8), Dec. 2008.

International Search Report, dated Mar. 16, 2010, issued in PCT/JP2010/050609.

Ylva et al., "Mobile Broadband, from LTE towards LTE-Adavanced", (IEICE) The Institute of Electronics, Information and Communication Engineers, Communications Society Conference, BT-4-4, Sep. 2, 2008.

Ericsson: "Carrier Aggregation in LTE-Advanced", TSG-RAN WG1 #53bis, Warsaw, Poland, Jun. 30-Jul. 4, 2008, R1-082468.

Fujitsu, "Anchor Component Carrier and Preferred Control Signal Structure", 3GPP, TSG-RAN #56, R1-090952, Athens, Greece, Jan. 9-13, 2009.

Huawei: "Discussion on CPC Feature for DC-HSDPA", 3GPP Draft; R1-083074, 3rd Generation Partnership Project (3GPP), Mobile Competence Centre; 650, Route Des Lucioles; F-06921 Sophia-Antipolis Cedex; France, No. Jeju; Aug. 13, 2008, XP050316517, [retrieved on Aug. 13, 2008], Section 2, 2 pages.

* cited by examiner

COMMUNICATION SYSTEM AND INTERMITTENT RECEPTION METHOD

TECHNICAL FIELD

The present invention relates to a communication system and an intermittent reception method and more particularly to a mobile station apparatus, a communication system, and an intermittent reception method in operation at the time of intermittent reception.

BACKGROUND ART

3GPP (3rd Generation Partnership Project) has standardized the W-CDMA as a third-generation cellular mobile communication mode and the service is sequentially started. HSDPA with higher communication speed has also been standardized and the service is started.

On the other hand, 3GPP is working on the standardization of the evolution of the third generation radio access (Evolved Universal Terrestrial Radio Access; hereinafter "EUTRA").

The OFDM (Orthogonal Frequency Division Multiplexing) is resistant to multipath interference and suitable for high-speed transmission and is employed as the downlink communication system of EUTRA. The DFT (Discrete Fourier Transform)-spread OFDM of the single carrier frequency division multiple mode SC-FDMA (Single Carrier-Frequency Division Multiple Access) is capable of reducing a peak to average power ratio PAPR of a transmitting signal and is employed as the uplink communication system in consideration of cost and power consumption of mobile station apparatuses.

The OFDM (Orthogonal Frequency Division Multiplexing) is proposed for the downlink of the EUTRA. The single carrier communication system of the DFT (Discrete Fourier Transform)-spread OFDM is proposed for the uplink of the EUTRA.

As depicted in FIG. 12, the downlink of EUTRA is made up of a downlink pilot channel DPiCH (Downlink Pilot Channel), a downlink synchronization channel DSCH (Downlink Synchronization Channel), a downlink shared channel PDSCH (Physical Downlink Shared Channel), a downlink control channel PDCCH (Physical Downlink Control Channel), and a common control channel CCPCH (Common Control Physical Channel).

The uplink of EUTRA is made up of an uplink pilot channel UPiCH (Uplink Pilot Channel), a random access channel RACH (Random Access Channel), an uplink shared channel PUSCH (Physical Uplink Shared Channel), and an uplink control channel PUCCH (Physical Uplink Control Channel) (Non-Patent Literatures 1 and 2).

A configuration of the downlink is depicted in FIGS. 13 and 14. One resource block is made up of twelve sub-carriers and seven OFDM symbols. One sub-frame is made up by using two resource blocks to assign the downlink shared channel PDSCH to at least one mobile station apparatus.

The downlink control channel PDCCH uses first to third symbols of the first resource block and the downlink shared channel PDSCH uses the rest of the OFDM symbols. The downlink pilot channel DPiCH is arranged in a scattered format in resource blocks as depicted in FIG. 13. FIG. 13 depicts an example when a base station apparatus has two transmission antennas and two types of pilot symbols exist. The downlink is made up of a plurality of resource blocks.

The downlink control channel PDCCH and the downlink shared channel PDSCH are received in a continuous reception mode and an intermittent reception (DRX: Discontinuous Reception) mode. As depicted in FIG. 15, the intermittent reception mode is introduced for suppressing the power consumption of a mobile station apparatus connected to a base station apparatus.

With regard to the intermittent reception mode, after the parameters related to the intermittent reception (such as a reception-ON period, a DRX interval, and a DRX start position) are specified for a mobile station apparatus by a base station apparatus, when the downlink control channel PDCCH and the downlink shared channel PDSCH are no longer received in the continuous reception mode, a shift to the intermittent reception mode is made at the DRX start position.

When the intermittent reception mode starts, the downlink control channel PDCCH is monitored during the reception period specified by the base station apparatus and, if downlink control data destined to its own mobile station apparatus is detected in the downlink control channel PDCCH, the reception-ON period is extended and the data reception of the downlink control channel PDCCH and the downlink shared channel PDSCH is prepared.

The intermittent reception mode includes short DRX and long DRX, and the long DRX is a DRX having a longer DRX interval than the short DRX. First, the intermittent reception mode is started with the short DRX. If the downlink shared channel PDSCH is not assigned through the downlink control channel PDCCH for a certain period, a shift is made from the short DRX to the long DRX. FIG. 16 depicts a relationship among the continuous reception, the short DRX, and the long DRX. A short DRX interval is an interval of 2 ms to 640 ms; a long DRX interval is an interval of 10 ms to 2560 ms; and each of the intervals is specified by the base station apparatus.

The parameters related to the intermittent reception include a DRX interval, a reception-ON period of the downlink control channel PDCCH, a reception-ON extension period when the reception-ON period is extended if the downlink control channel PDCCH is received during the reception-ON period of the downlink control channel PDCCH, a DRX start position, and a reception-ON period at the time of retransmission, and are sent to a mobile station apparatus through a message of an RRC layer (Radio Resource Control Layer) (Non-Patent Literatures 3, 4, and 5).

3GPP has also started discussing Advanced-EUTRA, which is a further evolution from EUTRA. Advanced-EUTRA is assumed to use a band of up to 100-MHz bandwidth for each of uplink and downlink to perform communications with transmission rates of up to 1 Gbps or more for downlink and 500 Mbps or more for uplink.

As depicted in FIG. 17, it is also conceived for Advanced-EUTRA to bundle a plurality of 20-MHz bands of EUTRA to realize a 100-MHz band such that a 100-MHz band can be supported by a mobile station apparatus of EUTRA. One 20-MHz band of EUTRA is referred to as a component carrier (CC) in Advanced-EUTRA.

PRIOR ART DOCUMENTS

Nonpatent Literatures

Nonpatent Literature 1: 3GPP TS (Technical Specification) 36.211, V8.50 (2008-012), Technical Specification Group Radio Access Network, Physical Channel and Modulation (Release 8)

Nonpatent Literature 2: 3GPP TS (Technical Specification) 36.212, V8.50 (2008-012), Technical Specification Group Radio Access Network, Multiplexing and channel coding (Release 8)

Nonpatent Literature 3: 3GPP TS (Technical Specification) 36.300, V8.70 (2008-012), Evolved Universal Terrestrial Radio Access (E-UTRA) and Evolved Universal Terrestrial Radio Access Network (E-UTRAN), Overall description Stage 2

Nonpatent Literature 4: 3GPP TS (Technical Specification) 36.321, V8.40 (2008-012), Evolved Universal Terrestrial Radio Access (E-UTRA) Medium Access Control (MAC) protocol specification Nonpatent Literature 5: 3GPP TS (Technical Specification) 36.331, V8.40 (2008-012), Evolved Universal Terrestrial Radio Access (E-UTRA) Radio Resource Control (RRC) Protocol specification

SUMMARY OF THE INVENTION

Problems to be Solved by the Invention

Although it is considered that a mobile station apparatus connected to a base station apparatus has a continuous reception mode and an intermittent reception mode to execute a reception process of intermittent reception depending on a data amount from the base station apparatus in Advanced-EUTRA as is the case with EUTRA, the details are not determined. Although a band processed by a mobile station apparatus of Advanced-EUTRA is wider than that of a mobile station apparatus of EUTRA and therefore the power consumption is increased, the power consumption of a mobile station apparatus in the intermittent reception mode is required to be equivalent to that of a mobile station apparatus of EUTRA.

The present invention solves the above problems and provides a base station apparatus and a mobile station apparatus that are intended to provide an efficient intermittent reception operation for a mobile station apparatus of Advanced-EUTRA.

A first technical means according to the present invention is a mobile station apparatus connecting to a base station apparatus by using a plurality of component carriers, wherein the mobile station apparatus applies one intermittent reception parameter to all the component carriers utilized by the mobile station apparatus, performs an operation of monitoring a control channel in all the component carriers during intermittent reception, and extends a reception-ON period in all the component carriers if the mobile station apparatus received the control channel destined to itself through one or more component carriers during the reception-ON period.

A second technical means is a mobile station apparatus connecting to a base station apparatus by using a plurality of component carriers, wherein the mobile station apparatus performs an operation of monitoring a control channel in one component carrier and an operation without monitoring the control channel in the other component carriers during intermittent reception, and performs a reception operation in all the connected component carriers during a reception-ON extension period when received the control data destined to itself during a reception-ON period.

A third technical means is a mobile station apparatus connecting to a base station apparatus by using a plurality of component carriers, wherein the mobile station apparatus performs an operation of monitoring a control channel in one component carrier and an operation without monitoring the control channel in the other component carriers during intermittent reception, and performs a reception operation in all the connected component carriers during a next reception-ON period if the mobile station apparatus received the control channel destined to itself during a reception-ON period.

A fourth technical means is a mobile station apparatus connecting to a base station apparatus by using a plurality of component carriers, wherein the mobile station apparatus performs an operation of monitoring a control channel in one component carrier during intermittent reception, and releases the connection to the base station for the other component carriers.

A fifth technical means is a communication system having a base station apparatus and a mobile station apparatus connected by using a plurality of component carriers, wherein the base station apparatus instructs the mobile station apparatus to perform an intermittent reception operation through an RRC message, and transmits a MAC message to the mobile station apparatus to terminate the intermittent reception operation when the mobile station apparatus is performing intermittent reception.

A sixth technical means is an intermittent reception method of a mobile station apparatus connecting to a base station apparatus by using a plurality of component carriers, wherein the mobile station apparatus applies one intermittent reception parameter to all the component carriers utilized by the mobile station apparatus to perform an operation of monitoring a control channel in all the component carriers during intermittent reception, and extends a reception-ON period in all the component carriers when received the control channel destined to itself through one or more component carriers during the reception-ON period.

A seventh technical means is an intermittent reception method of a mobile station apparatus connecting to a base station apparatus by using a plurality of component carriers, wherein the mobile station apparatus performs an operation of monitoring a control channel in one component carrier and an operation without monitoring the control channel in the other component carriers during intermittent reception, and performs a reception operation in all the connected component carriers during a reception-ON extension period when received the control data destined to itself during a reception-ON period.

An eighth technical means is an intermittent reception method of a mobile station apparatus connecting to a base station apparatus by using a plurality of component carriers, wherein the mobile station apparatus performs an operation of monitoring a control channel in one component carrier and an operation without monitoring the control channel in the other component carriers during intermittent reception, and performs a reception operation in all the connected component carriers during a next reception-ON period when received the control channel destined to itself during a reception-ON period.

A ninth technical means is an intermittent reception method of a mobile station apparatus connecting to a base station apparatus by using a plurality of component carriers, wherein the mobile station apparatus performs an operation of monitoring a control channel in one component carrier during intermittent reception, and releases the connection to the base station for the other component carriers.

A tenth technical means is an intermittent reception method for a mobile station apparatus performing intermittent reception in a communication system having a base station apparatus and the mobile station apparatus connected by using a plurality of component carriers, wherein the base station apparatus instructs the mobile station apparatus to perform an intermittent reception operation through an RRC message, and transmits a MAC message to the mobile station apparatus to terminate the intermittent reception operation when the mobile station apparatus is performing intermittent reception.

Effect of the Invention

The power consumption can be reduced in the intermittent reception operation when the mobile station apparatus has a plurality of component carriers.

MODES FOR CARRYING OUT THE INVENTION

First Embodiment

Figure 14:
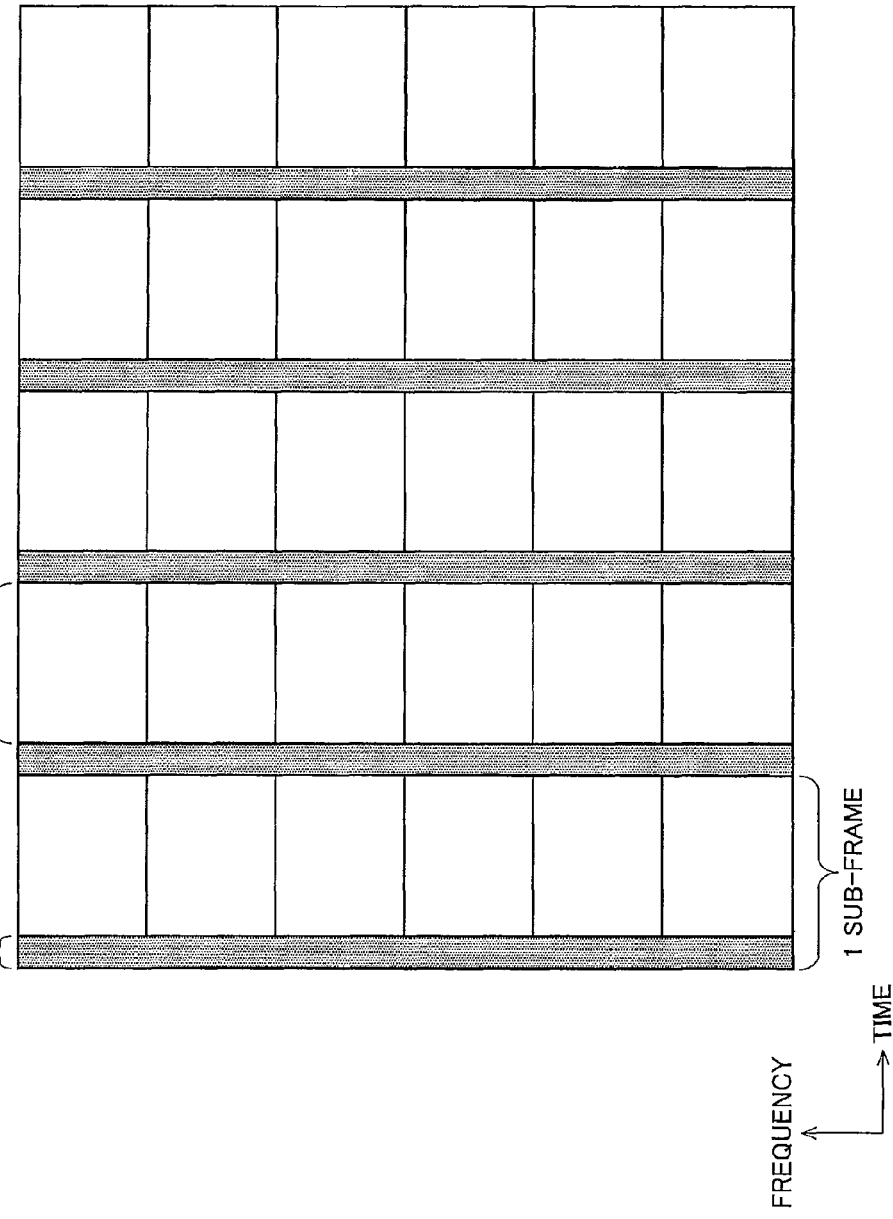
FIG. 14 is another diagram of a configuration example of downlink.
Figure 15:
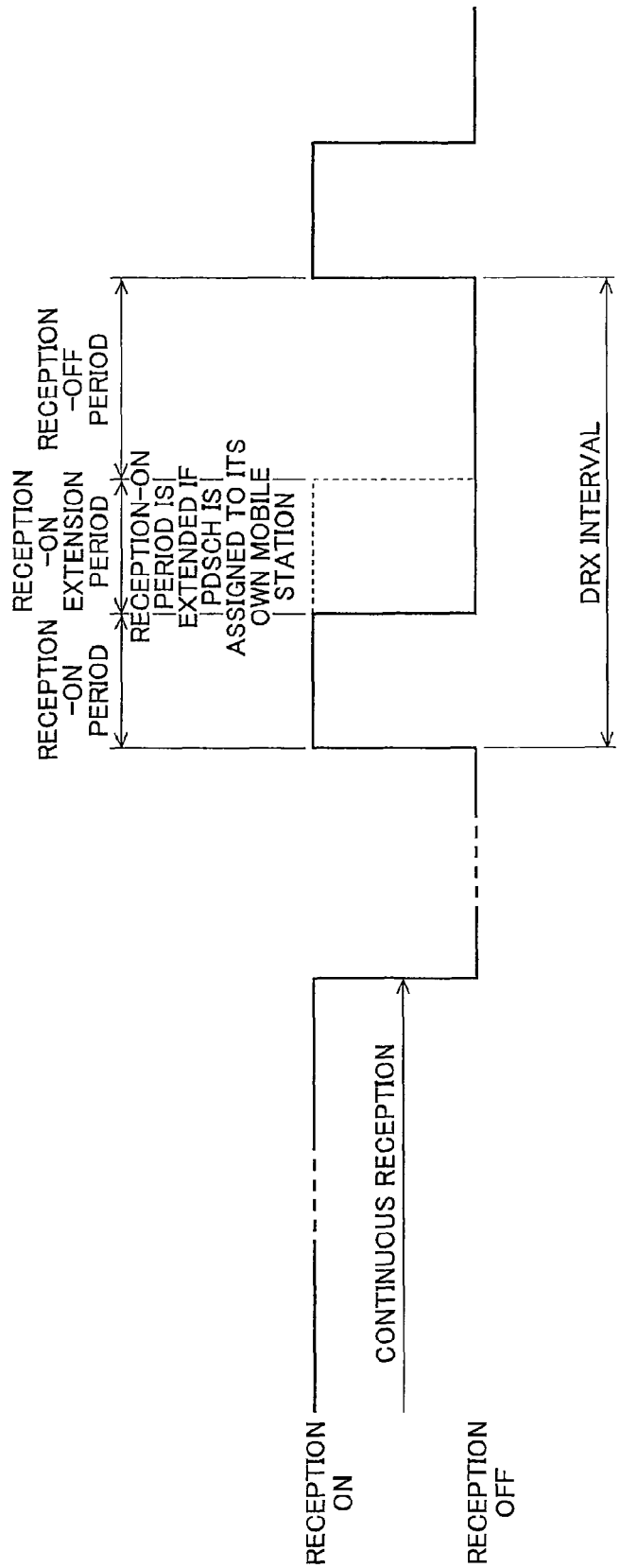
FIG. 15 is a diagram of a configuration example of DRX.
Figure 16:
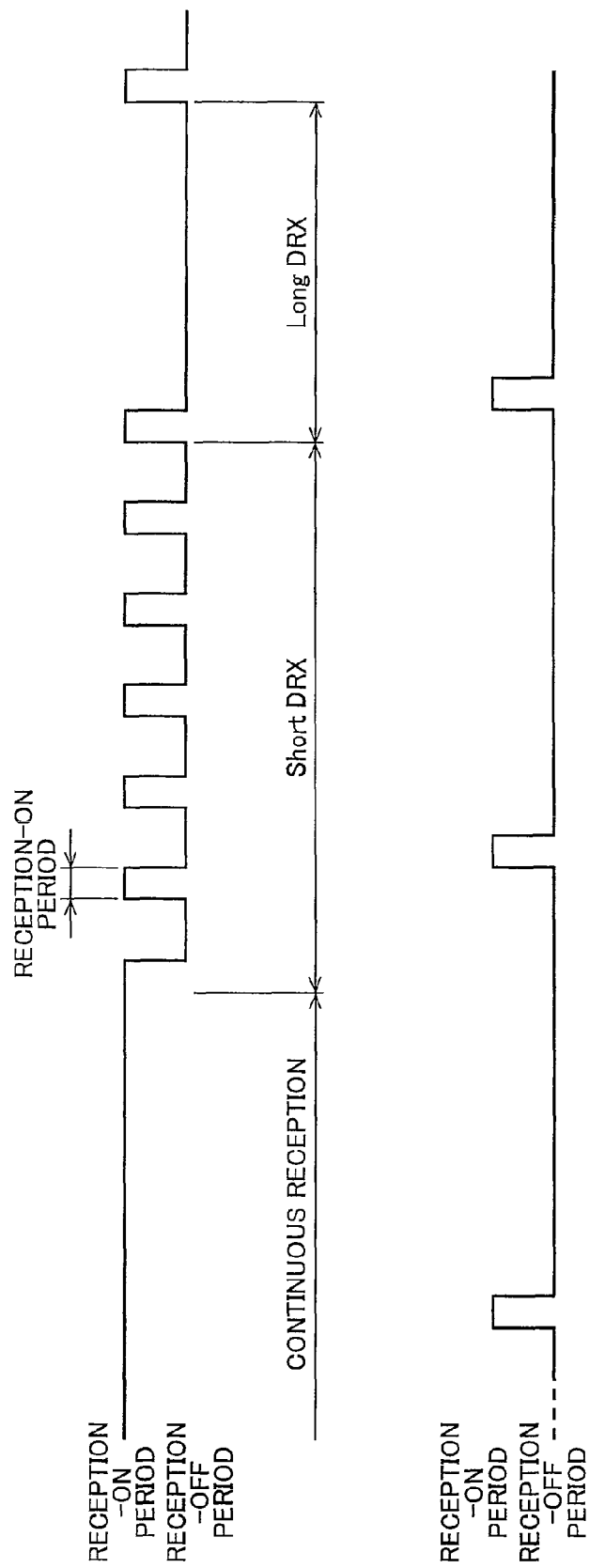
FIG. 16 is another diagram of a configuration example of DRX.
Figure 17:
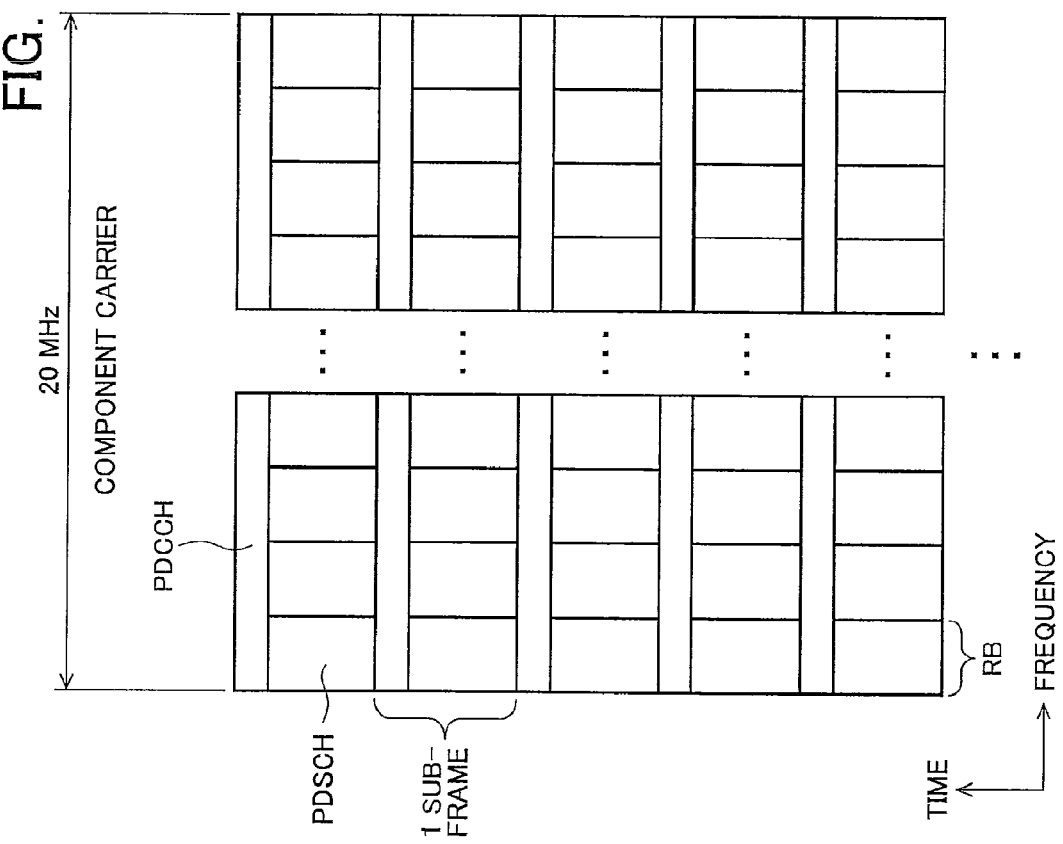
FIG. 17 is a diagram for explaining a component carrier.

A system as depicted in FIG. 17 is assumed as a system formed by utilizing a plurality of systems (or a plurality of bands) as depicted in FIG. 14. A communication system is assumed to have a continuous reception mode and an intermittent reception (DRX: Discontinuous Reception) mode for the reception of the downlink shared channel PDSCH as described with reference to FIGS. 15 and 16. One band is referred to as a component carrier (CC).

When a mobile station apparatus receives data on a plurality of CCs, it is currently contemplated that data is processed for each CC in a lower layer (physical layer) of the mobile station apparatus. In other words, it is contemplated that different data is transmitted in each CC and that a retransmission processing in the lower layer of the mobile station apparatus is executed CC by CC.

As a result, if a base station apparatus transmits DRX parameters for each CC and a mobile station apparatus performs DRX control for each CC, the DRX effect is almost lost since separate operations are performed for each CC. Therefore, the effect of DRX is acquired by performing the same DRX operation in all the CCs.

The operation of a mobile station apparatus will be described.

A base station apparatus notifies a mobile station apparatus of DRX parameters (such as a DRX interval, a reception-ON period of the downlink control channel PDCCH, an extension period of the reception-ON period when the downlink control channel PDCCH is received during the reception-ON period of the downlink control channel PDCCH, and a DRX start position) through any one CC of a plurality of CCs. When receiving the DRX parameters, the mobile station apparatus starts the DRX control from the DRX start position instructed by the base station apparatus. The mobile station apparatus applies the DRX parameters delivered from the base station apparatus to all the CCs and performs the DRX control depicted in FIG. 1 for all the CCs from the DRX start position.

Figure 1:
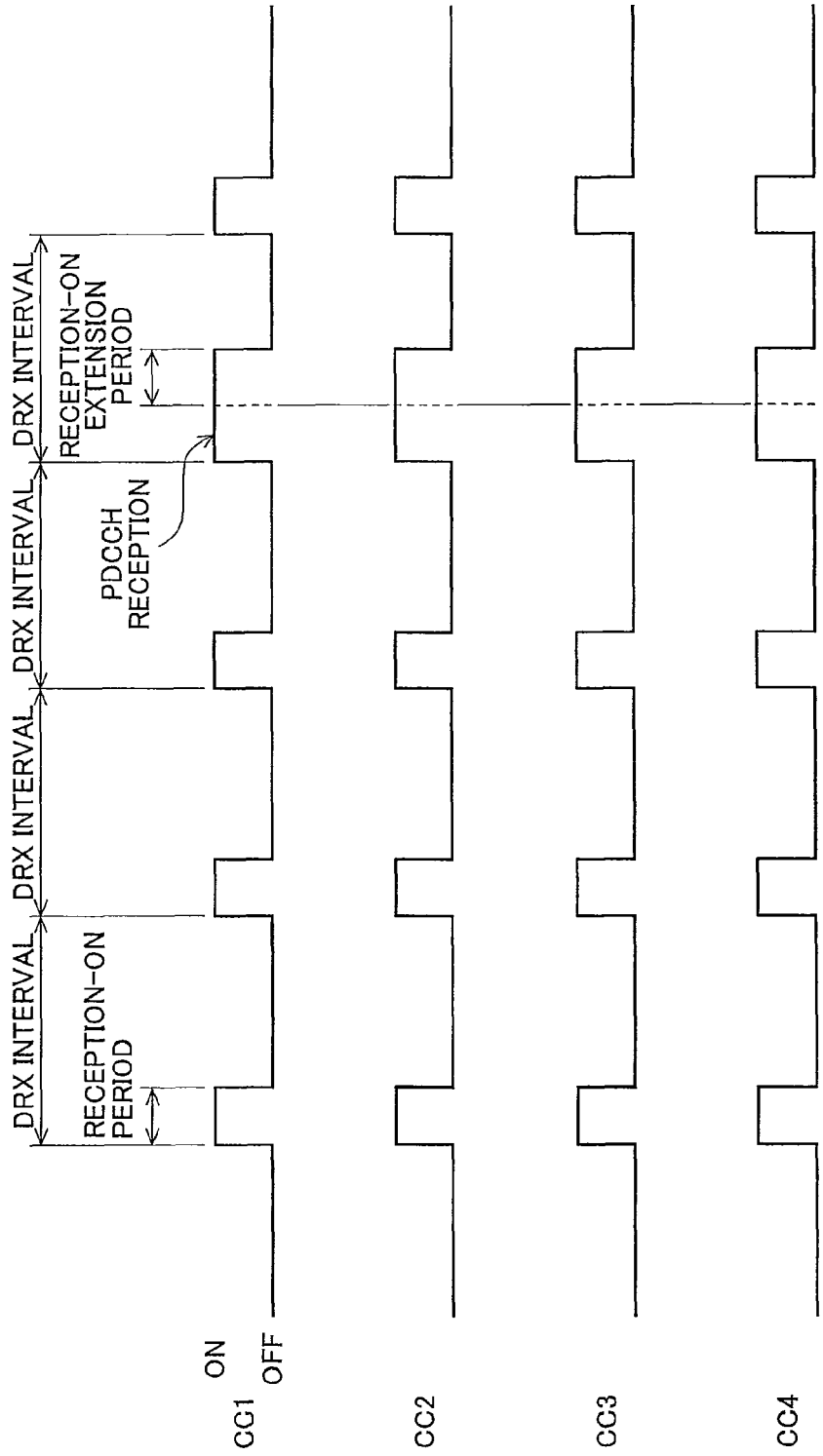
FIG. 1 is a diagram of an operation example of a mobile station apparatus at the time of intermittent reception according to a first embodiment of the present invention.

If the mobile station apparatus receives the control data destined to itself through the downlink control channel PDCCH in a CC during the reception-ON period, the mobile station apparatus extends the reception-ON period in all the CCs as depicted in FIG. 1. As a result, the reception-ON period can be extended in all the CCs simply by transmitting one downlink control channel PDCCH rather than transmitting the downlink control channels PDCCH to all the CCs from the base station apparatus and by receiving the one downlink control channel PDCCH with the mobile station apparatus, and the base station apparatus can transmit a large amount of data to the mobile station apparatus during the reception-ON period. Since the DRX parameters are transmitted in only one CC, wasteful use of resources can be prevented.

Figure 2:
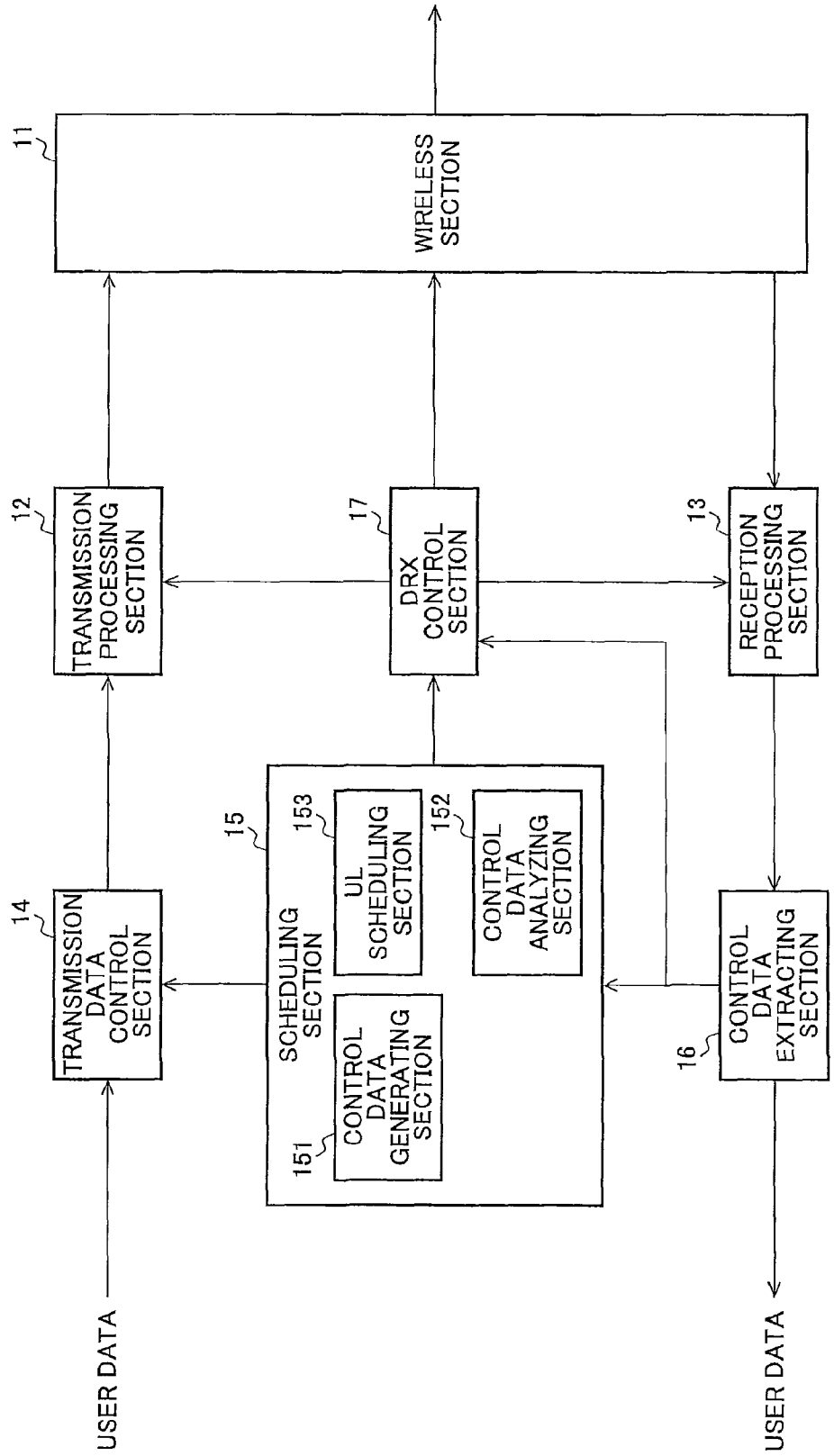
FIG. 2 is a diagram of a configuration of the mobile station apparatus according to the first embodiment of the present invention.

A configuration of the mobile station apparatus is depicted in FIG. 2. The configuration of the mobile station apparatus is made up of a wireless section 11, a transmission processing section 12, a reception processing section 13, a transmission data control section 14, a scheduling section 15, a control data extracting section 16, and a DRX control section 17. The scheduling section 15 is made up of a control data generating section 151, a control data analyzing section 152, and a UL scheduling section 153.

User data is input to the transmission data control section 14 and the transmission data control section 14 assigns the data to the channels and sends the data to the transmission processing section 12 in accordance with instructions from the scheduling section 15. A signal from the transmission data control section 14 is encoded and modulated. The modulated signal is serial/parallel-converted for parallelization, is then subjected to a DFT (Discrete Fourier Transform)-IFFT (Inverse Fast Fourier Transform) processing, and is parallel/serial-converted to serialize the signal along the time axis. A CP (Cyclic Prefix) is inserted into the serialized signal. The signal with the CP inserted is converted into an analogue signal by a D/A (digital/analogue) converting section, is up-converted to a wireless frequency by the wireless section 11, and is transmitted from a transmission antenna.

The wireless section 11 down-converts a wireless signal received from an antenna and delivers the signal to the reception processing section 13. The reception processing section 13 performs the A/D (analogue/digital) conversion of the signal delivered from the wireless section 11, executes the FFT (Fast Fourier Transform) processing, decoding, demodulation processing, etc., and delivers the demodulated data to the control data extracting section 16. The control data extracting section 16 monitors the downlink control channel PDCCH to determine whether the data is destined to the mobile station apparatus to which the control data extracting section 16 belongs, and divides the data of the downlink shared channel PDSCH demodulated by the reception processing section 13 into control data and user data if the data is destined to the mobile station apparatus. The control data is delivered to an uplink control section and the user data is delivered to a higher layer. If the downlink control channel PDCCH destined to the mobile station apparatus is received, the control data extracting section 16 gives a notification to the DRX control section 17. The control data extracting section 16 instructs the scheduling section 15 to return a response to the received data.

The scheduling section 15 is made up of the UL scheduling section 153, the control data analyzing section 152, and the control data generating section 151, and the control data generating section 151 generates control data and generates a response to the downlink data received by the control data extracting section 16. The control data analyzing section 152 analyzes the control data, delivers scheduling information of uplink data to the UL scheduling section 153, and delivers the DRX parameters for performing the intermittent reception to the DRX control section 17. The UL scheduling section 153 controls the transmission data control section 14 based on the scheduling information.

The DRX control section 17 performs the power management of the processing sections and uses the DRX parameters delivered from the scheduling section 15 to perform the power management of the wireless section 11, the transmission processing section 12, the reception processing section 13, etc. The DRX control section 17 starts the DRX operation from the DRX start position and turns on the wireless section 11 and the reception processing section 13 during the reception-ON period. If it is reported from the control data extracting section 16 that the downlink control channel PDCCH is received, the DRX control section 17 extends the reception-ON period by the reception-ON extension period. If data is transmitted to the base station apparatus, the DRX control section 17 turns on the transmission processing section 12. Although not depicted, the DRX control section 17 may perform the power control of the transmission data control section 14, the control data extracting section 16, and the scheduling section 15.

Figure 3:
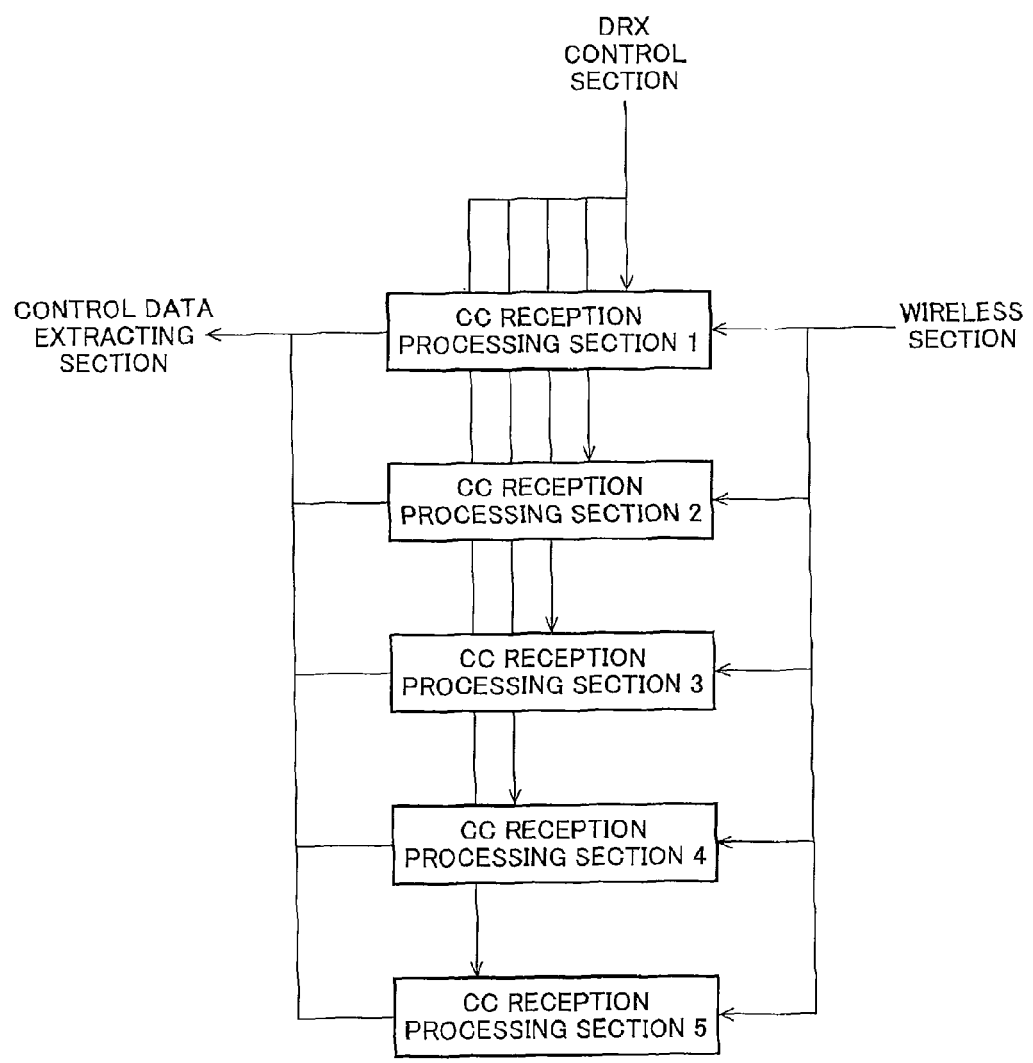
FIG. 3 is a diagram of a configuration of a reception processing section of the mobile station apparatus according to the first embodiment of the present invention.
Figure 4:
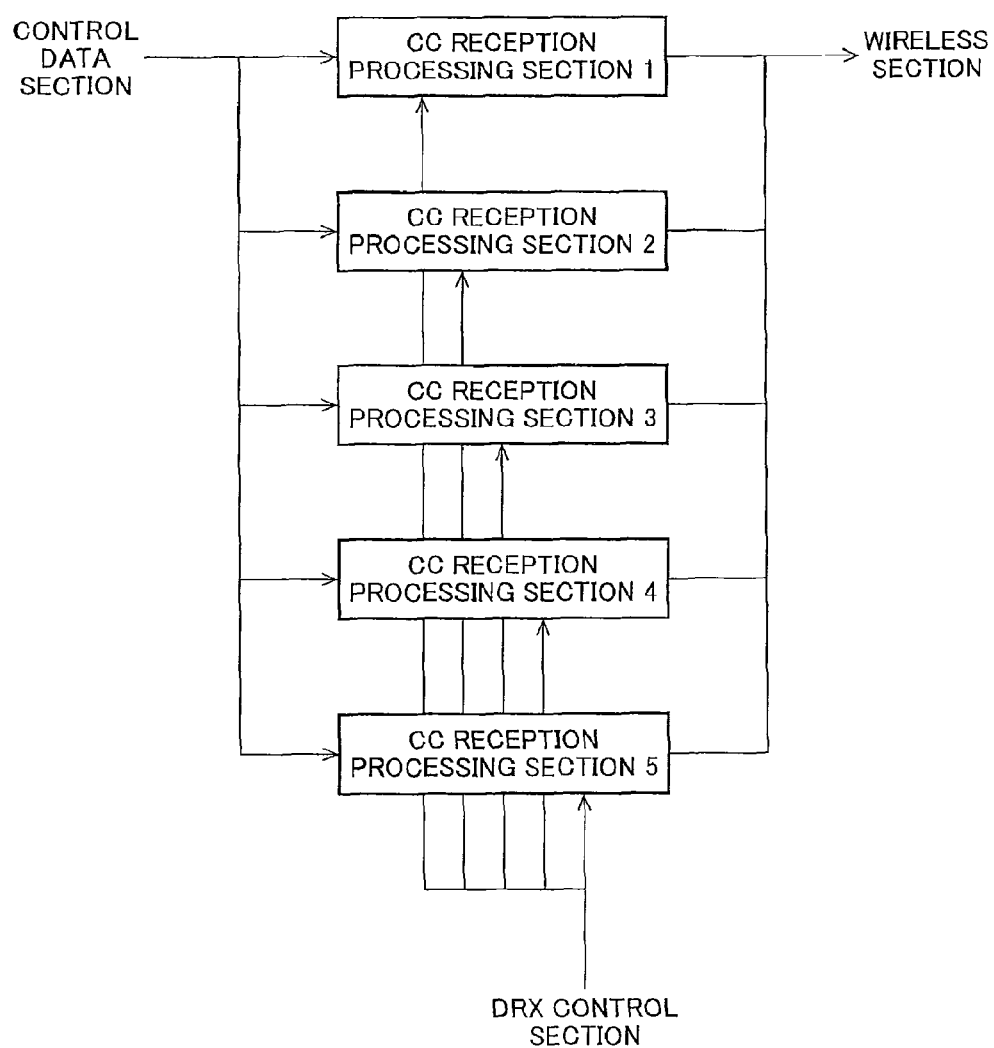
FIG. 4 is a diagram of a configuration of a transmission processing section of the mobile station apparatus according to the first embodiment of the present invention.

The transmission processing section 12 and the reception processing section 13 have processing sections separated for each CC as depicted in FIGS. 3 and 4, and the CC processing sections are supplied with electric power from the DRX control section 17 and the power is turned off for CCs not in the reception-ON state or the transmission state.

The base station apparatus determines CC to be used by the mobile station apparatus and notifies the mobile station apparatus of the component carrier to be used by the mobile station apparatus. The base station apparatus sets the DRX parameters suitable for the mobile station apparatus and notifies the mobile station apparatus of the DRX parameters.

Second Embodiment

Although the DRX operation is performed in all the CCs in the example described in the first embodiment, the intermittent reception is performed in one CC when the intermittent reception is performed in the example described in this embodiment.

The operation of a mobile station apparatus will be described.

Figure 5:
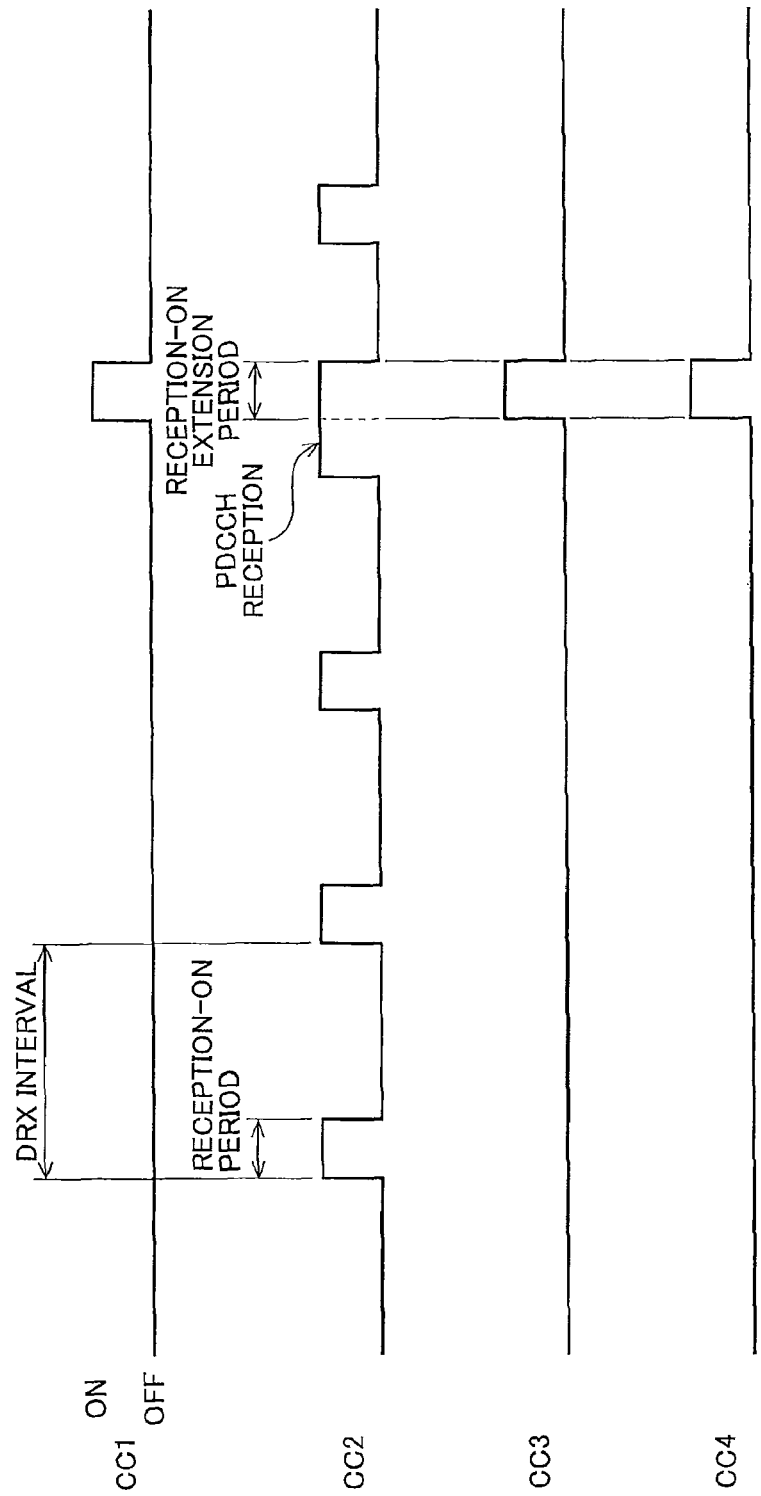
FIG. 5 is a diagram of an operation example of a mobile station apparatus at the time of intermittent reception according to a second embodiment of the present invention.

A base station apparatus notifies a mobile station apparatus of DRX parameters (such as a DRX interval, a reception-ON period of the downlink control channel PDCCH, an extension period of the reception-ON period when the downlink control channel PDCCH is received during the reception-ON period of the downlink control channel PDCCH, and a DRX start position) through any one CC of a plurality of CCs. When receiving the DRX parameters, the mobile station apparatus starts the DRX control from the DRX start position instructed by the base station apparatus only in the CC through which the DRX parameters are received. The mobile station apparatus performs the intermittent reception operation in only one CC as depicted in FIG. 5. No reception processing is executed in CCs other than the DRX-controlled CC.

If a mobile station apparatus receives the control data destined to itself through the downlink control channel PDCCH during the reception-ON period, the mobile station apparatus extends the reception-ON period in all the CCs as depicted in FIG. 5. As a result, the reception-ON period can be extended in all the CCs simply by transmitting one downlink control channel PDCCH rather than transmitting the downlink control channels PDCCH to all the CCs from the base station apparatus and by receiving the one downlink control channel PDCCH with the mobile station apparatus, and therefore the base station apparatus can transmit a large amount of data to the mobile station apparatus during the extended reception-ON period. Since the downlink control channel PDCCH is monitored in only one CC while the mobile station apparatus performs the DRX control, the power consumption may be reduced as compared to the case of monitoring in all the CCs.

Although the DRX control is performed only in the CC through which the DRX parameters are received in this example, each CC in a plurality of CCs may be prioritized so as to perform the DRX control only in the CC having the highest priority, or the CC subjected to the DRX control may be specified in the DRX parameters. Alternatively, the DRX control may be performed in a plurality of CCs. For example, the reception processing from the base station apparatus may usually be executed in five CCs and two CCs may be monitored at the time of DRX.

The reception-ON period may be extended in all the CCs if the downlink control channel PDCCH is consecutively received in a plurality of the reception-ON periods or if the downlink control channel PDCCH is received at a certain temporal position.

Third Embodiment

The intermittent reception is performed in one CC when the intermittent reception is performed in the example described in this embodiment.

A base station apparatus notifies a mobile station apparatus of DRX parameters (such as a DRX interval, a reception-ON period of the downlink control channel PDCCH, an extension period of the reception-ON period when the downlink control channel PDCCH is received during the reception-ON period of the downlink control channel PDCCH, and a DRX start position) through any one CC of a plurality of CCs. When receiving the DRX parameters, the mobile station apparatus starts the DRX control from the DRX start position only in the CC through which the DRX parameters are received. No reception processing is executed in CCs other than the DRX-controlled CC.

Figure 6:
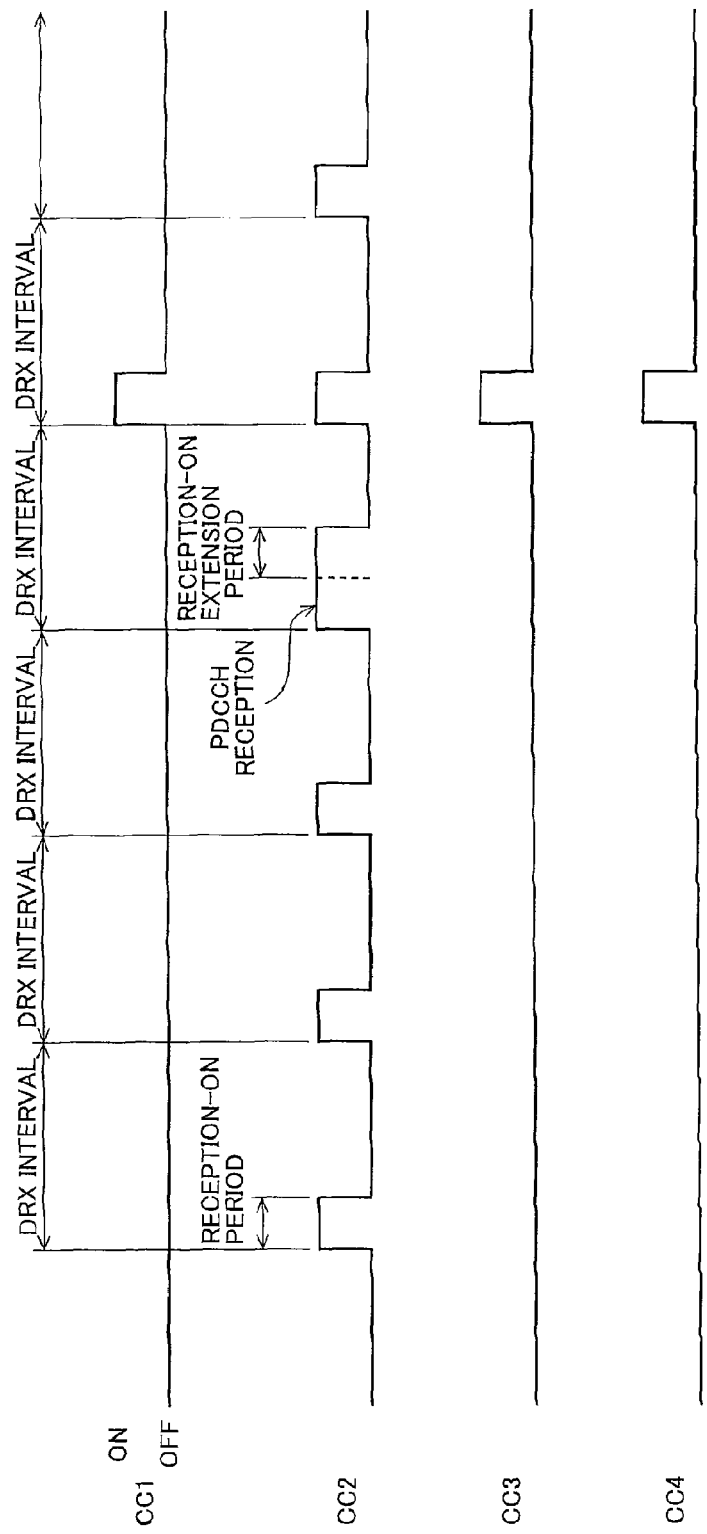
FIG. 6 is a diagram of an operation example of a mobile station apparatus at the time of intermittent reception according to a third embodiment of the present invention.

The mobile station apparatus performs the intermittent reception operation in only one CC as depicted in FIG. 6. If the mobile station apparatus receives the control data destined to itself through the downlink control channel PDCCH during the reception-ON period, the mobile station apparatus extends the reception-ON period in the CC as depicted in FIG. 6 and if any data is transmitted from the base station apparatus, executes reception processing. The mobile station apparatus puts all the CCs into the reception-ON state during the next reception-ON period. If the mobile station apparatus receives the control data destined to itself through the downlink control channel PDCCH during this reception-ON period, the mobile station apparatus extends the reception-ON period in all the CCs.

The base station apparatus transmits data when all the CCs are in the reception-ON state and the mobile station apparatus receives the data. As a result, the reception state can be set for all the CCs simply by transmitting one downlink control channel PDCCH rather than transmitting the downlink control channels PDCCH to all the CCs from the base station apparatus and by receiving the one downlink control channel PDCCH by the mobile station apparatus and, since the downlink control channel PDCCH is monitored in only one CC while the mobile station apparatus performs the DRX control, the power consumption may be reduced as compared to the case of monitoring in all the CCs. The control of the mobile station apparatus may be simplified.

Although the DRX control is performed only in the CC through which the DRX parameters are received in this example, each CC in a plurality of CCs may be prioritized so as to perform the DRX control only in the CC having the highest priority, or the CC subjected to the DRX control may be specified in the DRX parameters. Alternatively, the DRX control may be performed in a plurality of CCs. For example, the reception processing from the base station apparatus may usually be executed in five CCs and two CCs may be monitored at the time of DRX.

Fourth Embodiment

The intermittent reception is performed in one CC when the intermittent reception is performed in the example described in this embodiment.

A base station apparatus notifies a mobile station apparatus of DRX parameters (such as a DRX interval, a reception-ON period of the downlink control channel PDCCH, an extension period of the reception-ON period when the downlink control channel PDCCH is received during the reception-ON period of the downlink control channel PDCCH, and a DRX start position) through any one CC of a plurality of CCs. When receiving the DRX parameters, the mobile station apparatus starts the intermittent reception operation from the DRX start position only in the CC through which the DRX parameters are received. The mobile station apparatus executes no reception processing in CCs other than the CC in which the intermittent reception operation is performed.

Figure 7:
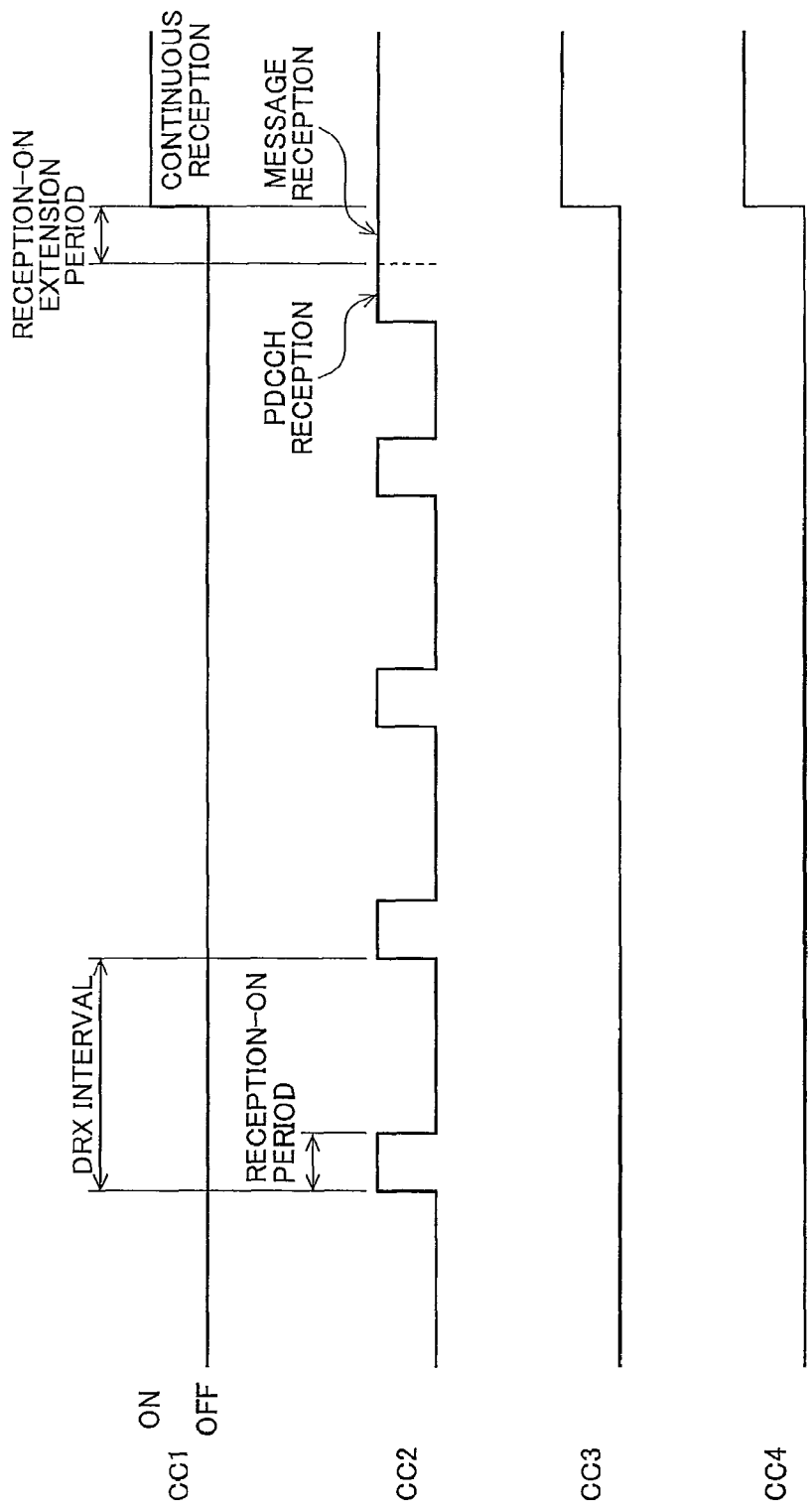
FIG. 7 is a diagram of an operation example of a mobile station apparatus at the time of intermittent reception according to a fourth embodiment of the present invention.

The mobile station apparatus performs the DRX control in only one CC as depicted in FIG. 7. If the mobile station apparatus receives the control data destined to itself through the downlink control channel PDCCH during the reception-ON period, the mobile station apparatus extends the reception-ON period only in the CC as depicted in FIG. 7. Therefore, the data reception operation is performed in only one CC during the DRX control. If it is desired to transmit a large amount of data to the mobile station apparatus, the base station apparatus sends such a message that causes all the CCs to perform the reception operation (a message that terminates the intermittent reception operation) through the DRX-operated CC to the mobile station apparatus. The mobile station apparatus receives the message and puts all the CCs into the continuous reception state after processing the message. The message for returning to the continuous reception in this case may be a message of a higher layer (Radio Resource Control layer: RRC layer) or may be a flag that starts/terminates the intermittent reception operation, such as one bit of a lower layer such as a MAC (Medium Access Control) layer, so as to accelerate the processing.

If it is determined that the mobile station apparatus processes the message and the mobile station apparatus has put into the reception state in all the CCs, the base station apparatus transmits data to all the CCs and the mobile station apparatus receives the data from the base station apparatus. As a result, the reception state can be set for all the CCs simply by transmitting one downlink control channel PDCCH rather than transmitting the downlink control channels PDCCH to all the CCs from the base station apparatus and by receiving the one downlink control channel PDCCH by the mobile station apparatus and, since the downlink control channel PDCCH is basically monitored in only one CC while the DRX control is performed, the power consumption may be reduced as compared to the case of monitoring in all the CCs. The control of the mobile station apparatus may be simplified.

The configurations of the mobile station apparatuses of the second to fourth embodiments are the same as the configuration of the mobile station apparatus described in FIG. 2.

Fifth Embodiment

Although all the CCs are operated during the continuous reception and one CC is operated during the intermittent reception in the example described in the fourth embodiment, one CC is operated and other CCs are released during the intermittent reception operation in the example described in this embodiment.

A base station apparatus notifies a mobile station apparatus of DRX parameters (such as a DRX interval, a reception-ON period of the downlink control channel PDCCH, an extension period of the reception-ON period when the downlink control channel PDCCH is received during the reception-ON period of the downlink control channel PDCCH, and a DRX start position) through any one CC of a plurality of CCs. When receiving the DRX parameters, the mobile station apparatus starts the DRX control from the DRX start position only in the CC through which the DRX parameters are received. The mobile station apparatus executes no reception processing in CCs other than the CC in which the intermittent reception operation is performed. The connection to the base station apparatus is disconnected in the CCs in which no intermittent reception operation is performed.

Figure 8:
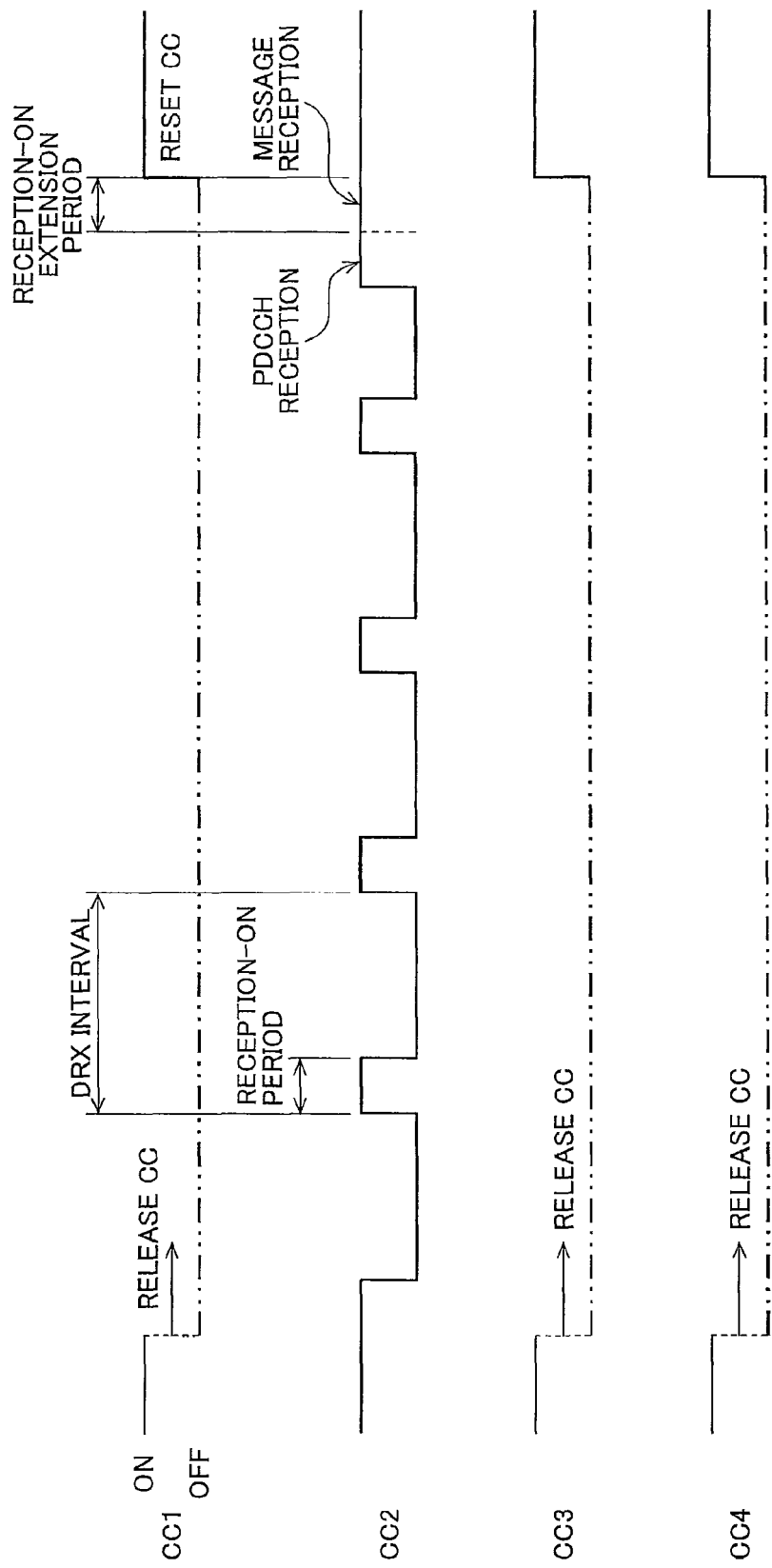
FIG. 8 is a diagram of an operation example of a mobile station apparatus at the time of intermittent reception according to a fifth embodiment of the present invention.

The mobile station apparatus performs the intermittent reception operation as depicted in FIG. 8. The mobile station apparatus extends the reception-ON period in the CC as depicted in FIG. 8 when received the control data destined to itself through the downlink control channel PDCCH during the reception-ON period. Therefore, the data reception operation is performed in only one CC during the DRX control. If it is desired to transmit a large amount of data to the mobile station apparatus, the base station apparatus sends a connection message for all the other CCs through the CC performing DRX operation to the mobile station apparatus. The mobile station apparatus receives this message and makes a shift to the reception state for all the CCs after processing the message. This connection message may specify CCs to be connected.

If it is determined that the mobile station apparatus has processed the message and the mobile station apparatus has put into the reception state in all the CCs, the base station apparatus transmits the data to all the CCs and the mobile station apparatus receives the data. As a result, the reception state can be set for all the CCs simply by transmitting one downlink control channel PDCCH rather than transmitting the downlink control channels PDCCH to all the CCs from the base station apparatus and by receiving the one downlink control channel PDCCH by the mobile station apparatus and, since the downlink control channel PDCCH is basically monitored in only one CC while the DRX control is performed, the power consumption may be reduced as compared to the case of monitoring in all the CCs. The mobile station apparatus periodically measures the wireless qualities of the connected base station apparatus and other base station apparatuses even in the CCs in which no reception processing is executed. The need to perform this wireless link quality measurement is eliminated, leading to the reduction of the power consumption.

Figure 9:
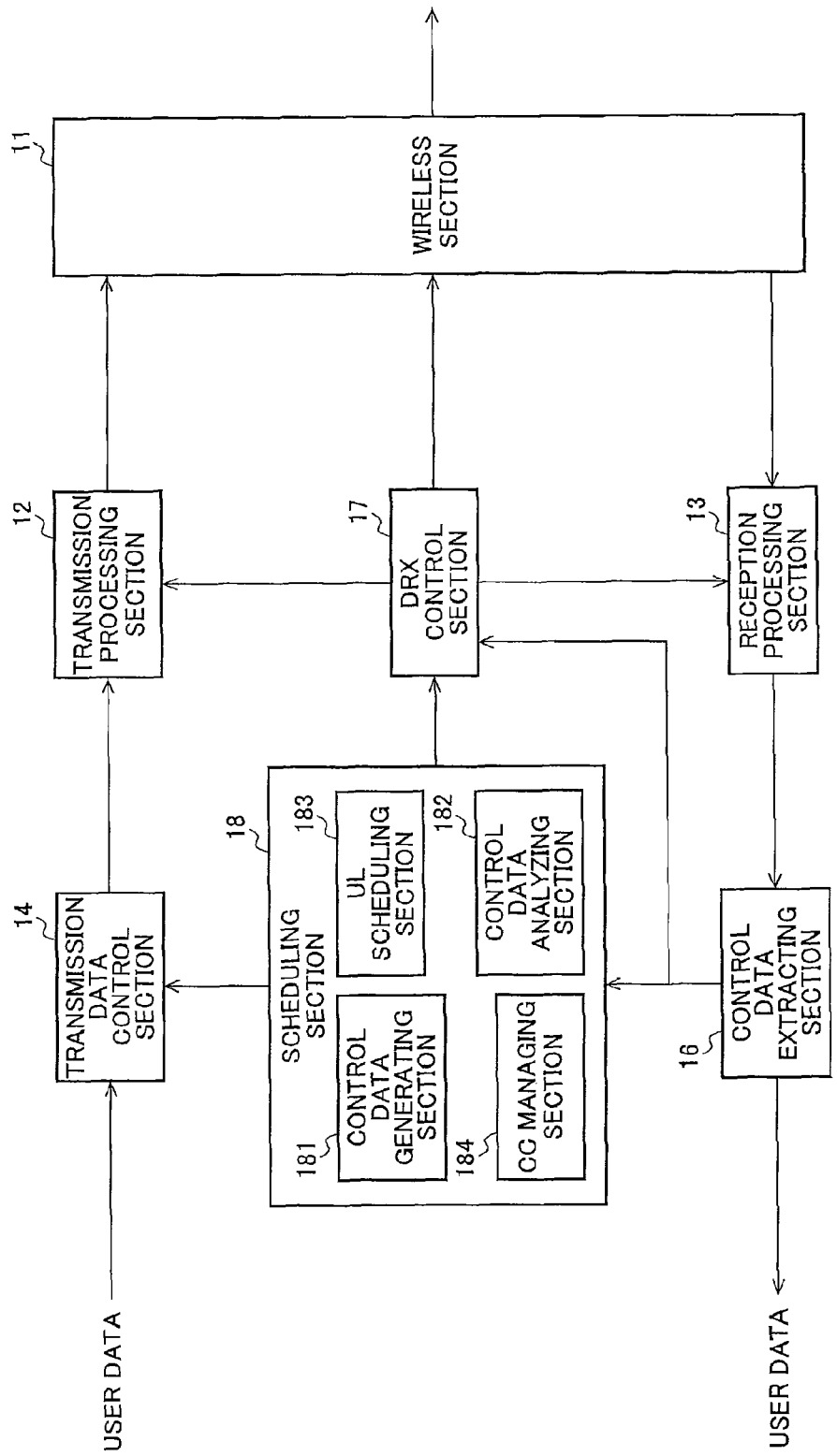
FIG. 9 is a diagram of a configuration of the mobile station apparatus according to the fifth embodiment of the present invention.

A configuration of the mobile station apparatus is depicted in FIG. 9. The configuration of the mobile station apparatus is made up of the wireless section 11, the transmission processing section 12, the reception processing section 13, the transmission data control section 14, a scheduling section 18, the control data extracting section 16, and the DRX control section 17. The scheduling section 18 is made up of a control data generating section 181, a control data analyzing section 182, a UL scheduling section 183, and a CC managing section 184.

The operations of the wireless section 11, the transmission processing section 12, the reception processing section 13, the transmission data control section 14, and the control data extracting section 16 are the same as those of the mobile station apparatus depicted in FIG. 2.

The scheduling section 18 is made up of the UL scheduling section 183, the control data analyzing section 182, the control data generating section 181, and the CC managing section 184, and the control data generating section 181 generates control data and generates a response to the downlink data received by the control data extracting section 16. The control data analyzing section 182 analyzes the control data, delivers scheduling information of uplink data to the UL scheduling section 183, and delivers the DRX parameters for performing the intermittent reception to the DRX control section 17. The control data analyzing section 182 also delivers setting/release information of CCs to the CC managing section 184. The UL scheduling section 183 controls the transmission data control section 14 based on the scheduling information.

The CC managing section 184 manages the setting and release of CCs. If a CC is set, the CC managing section 184 instructs the DRX control section 17 to supply electric power to the set CC processing section and to stop the power supply to the processing sections that process CCs to be released when the intermittent reception operation is initiated.

The DRX control section 17 performs the power management of the processing sections and uses the DRX parameters delivered from the scheduling section 18 to perform the power management of the wireless section 11, the transmission processing section 12, the reception processing section 13, etc. The DRX control section 17 starts the DRX operation from the DRX start position and powers on the wireless section 11 and the reception processing section 13 during the reception-ON period. If it is reported from the control data extracting section 16 that the downlink control channel PDCCH is received, the DRX control section 17 extends the reception-ON period by the reception-ON extension period. If data is transmitted to the base station apparatus, the DRX control section 17 powers on the transmission processing section 12. The DRX control section 17 performs the power management of the processing sections in accordance with the instructions from the scheduling section 18. Although not depicted, the DRX control section 17 may perform the power control of the transmission data control section 14, the control data extracting section 16, and the scheduling section 18.

The transmission processing section 12 and the reception processing section 13 have processing sections separated for each CC as depicted in FIGS. 3 and 4, and the CC processing sections are supplied with electric power from the DRX control section 17 and are powered off for CCs not in the reception-ON state or the transmission state.

The base station apparatus determines CC to be used by the mobile station apparatus and notifies the mobile station apparatus of the component carrier to be used by the mobile station apparatus. The base station apparatus sets the DRX parameters suitable for the mobile station apparatus and notifies the mobile station apparatus of the DRX parameters. If it is recognized that the mobile station apparatus has started the intermittent reception with the specified DRX parameters, the base station apparatus releases the connection to CCs other than the CC subjected to the intermittent reception control. In other words, data is never transmitted to the released CCs. If the data destined to the mobile station apparatus is accumulated to a certain amount or more in a buffer of the base station apparatus, the base station apparatus transmits a connection message of CC to the mobile station apparatus through the CC in which the intermittent reception is performed, confirms that the continuous reception is performed in all the CCs, and transmits the data to the mobile station apparatus.

Sixth Embodiment

Although the connection to the base station apparatus is released for CCs in which the intermittent reception operation is not performed in the example described in the fifth embodiment, the timing of releasing the connection to the base station apparatus is specified for each of CCs in the example described in this embodiment.

Although a frequency of data reception may still increase at the stage just after the mobile station apparatus makes a shift from the normal reception state to the intermittent reception state, reception of a large amount of data is not likely to occur in the case of the prolonged DRX reception state. Therefore, the power consumption is reduced by performing the DRX reception in a plurality of CCs during the initial period after the shift to the DRX reception state and by sequentially reducing the CCs used.

The base station apparatus notifies the mobile station apparatus of DRX parameters (such as a DRX interval, a reception-ON period of the downlink control channel PDCCH, an extension period of the reception-ON period when the downlink control channel PDCCH is received during the reception-ON period of the downlink control channel PDCCH, and a DRX start position) common to all the CCs. The base station apparatus gives a notification of the effective periods of the CCs after DRX at the same time. When receiving the DRX parameters, the mobile station apparatus starts the DRX control from the DRX start position for all the CCs. The mobile station apparatus performs the intermittent reception operation.

Figure 10:
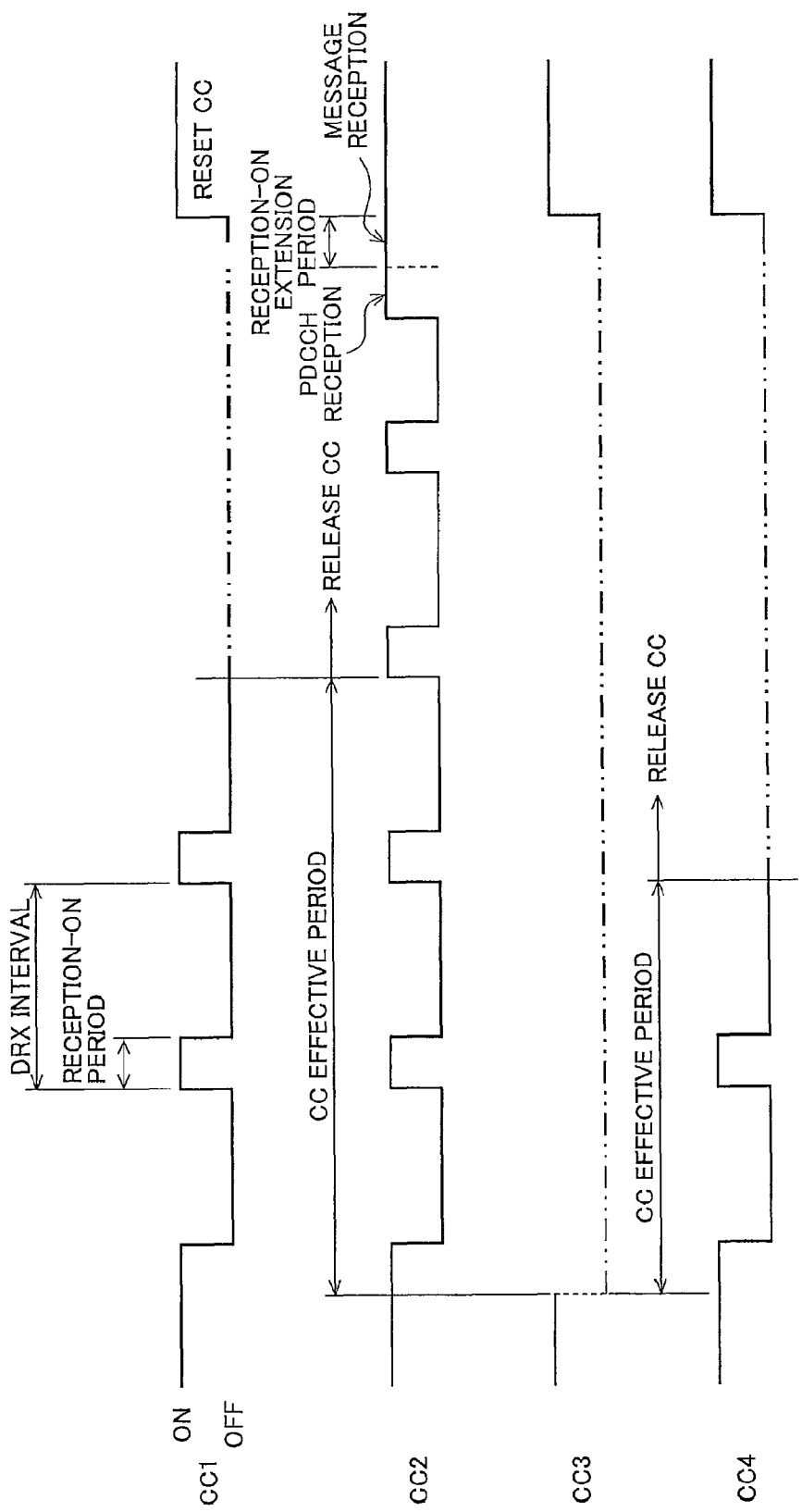
FIG. 10 is a diagram of an operation example of a mobile station apparatus at the time of intermittent reception according to a sixth embodiment of the present invention.
Figure 11:
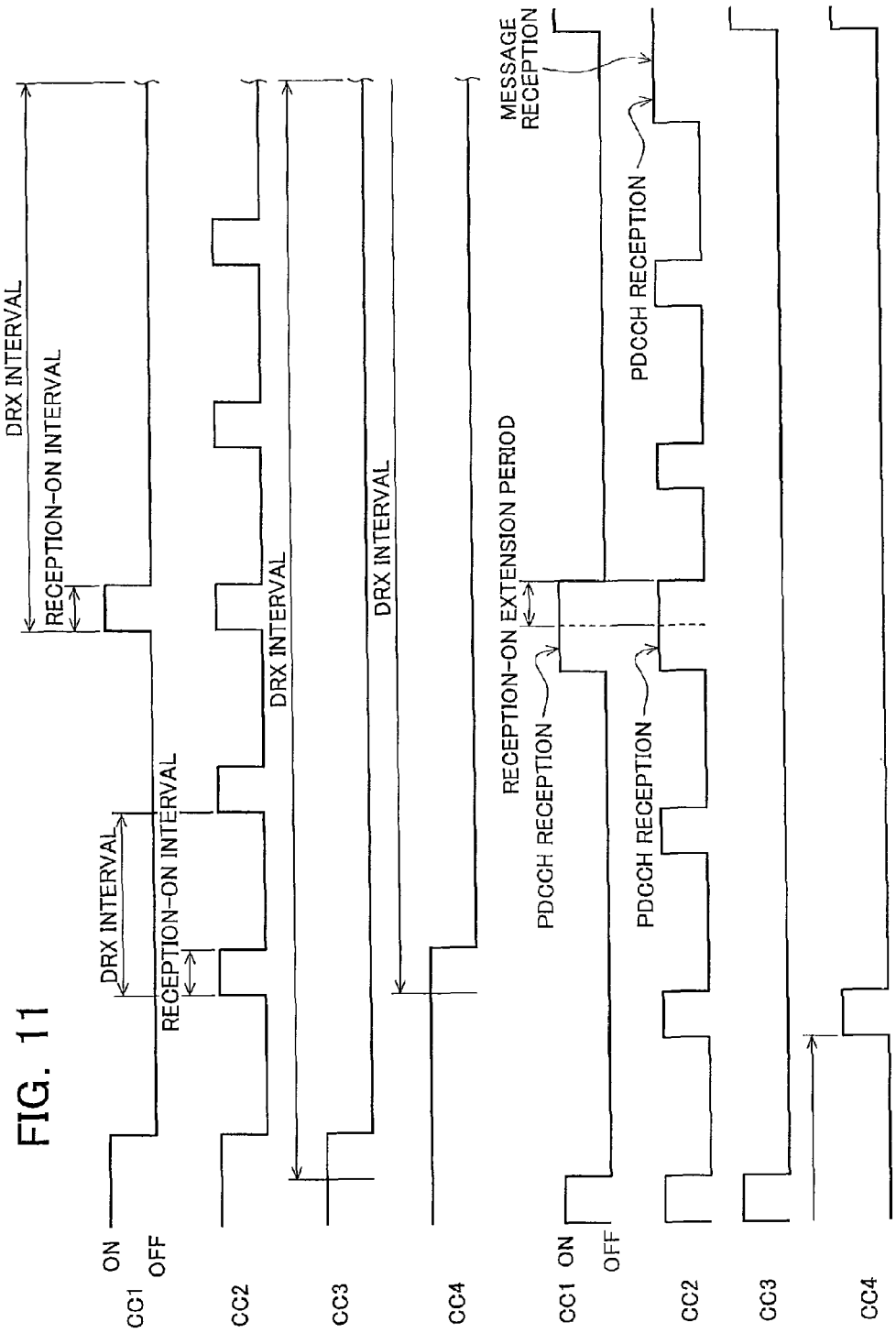
FIG. 11 is a diagram of an operation example of a mobile station apparatus at the time of intermittent reception according to a seventh embodiment of the present invention.
Figure 12:
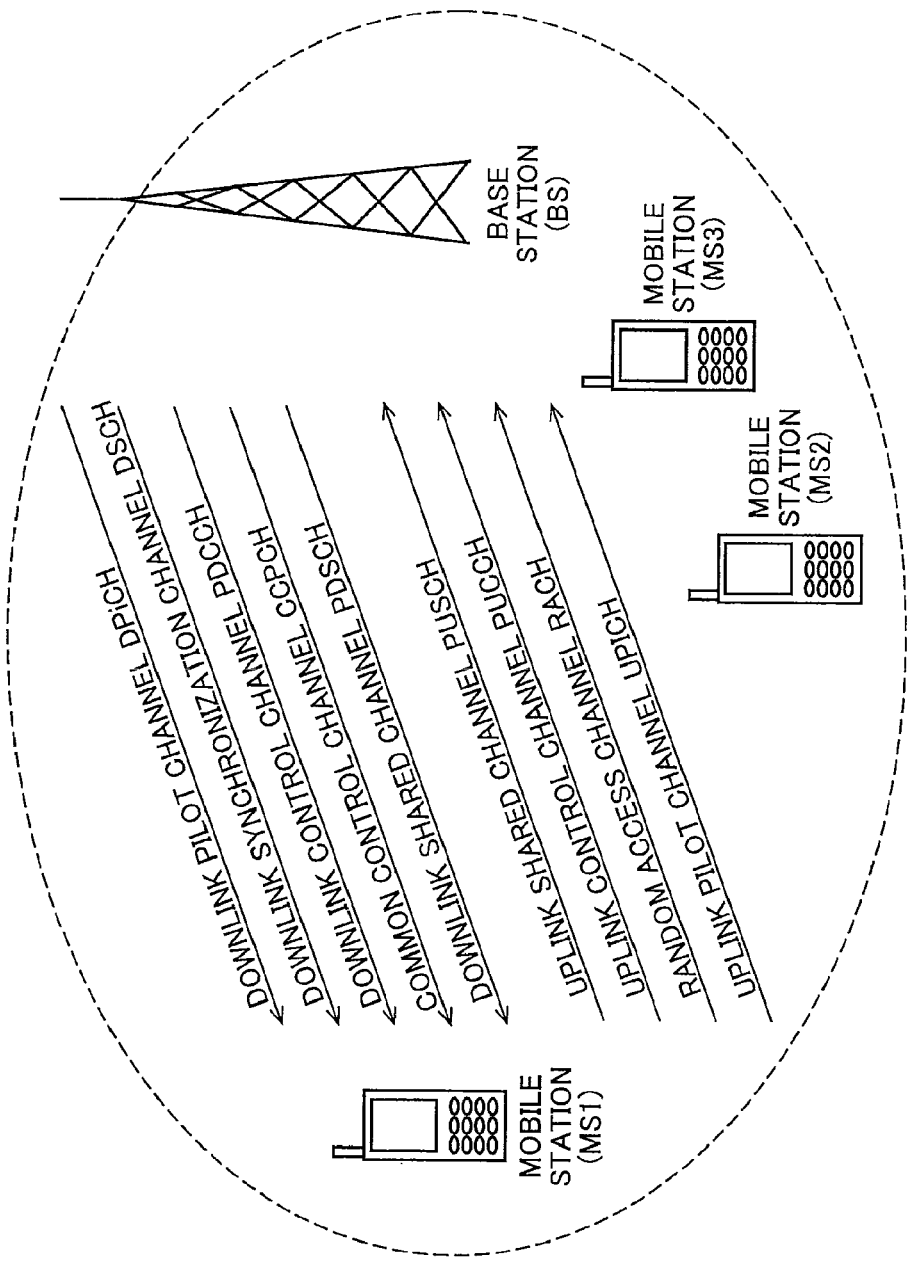
FIG. 12 is a diagram of an example of a channel configuration of EUTRA.
Figure 13:
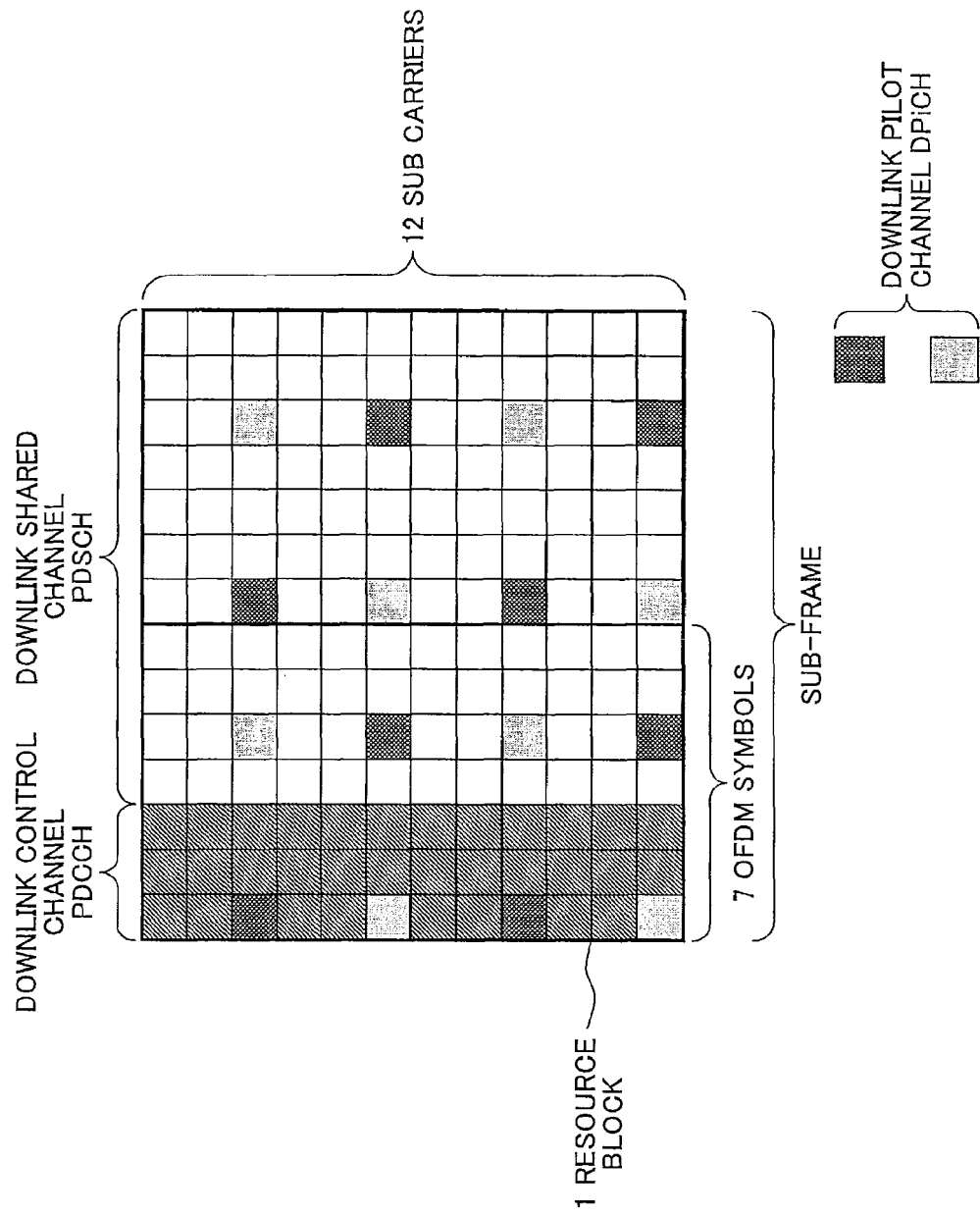
FIG. 13 is a diagram of a configuration example of downlink.

When the mobile station apparatus receives the control data destined to itself through the downlink control channel PDCCH during the reception-ON period, the mobile station apparatus extends the reception-ON period in all the effective CCs as depicted in FIG. 10. Therefore, the data reception operation is performed in the effective CCs during the DRX control. If the effective period of CC expires in each CC, the mobile station apparatus terminates the reception processing in the CC to release the CC. The effective period of CC may be a period starting when DRX is initiated or a period starting when the last data is received during DRX.

If it is desired to transmit a large amount of data to the mobile station apparatus, the base station apparatus sends a connection message for the other CCs to the mobile station apparatus through the CC performing DRX operation.

If it is determined that the mobile station apparatus has processed the message and the mobile station apparatus has put into the reception state in all the CCs, the base station apparatus transmits the data to all the CCs and the mobile station apparatus receives the data. As a result, the reception state can be set for all the CCs simply by transmitting one downlink control channel PDCCH rather than transmitting the downlink control channels PDCCH to all the CCs from the base station apparatus and by receiving the one downlink control channel PDCCH by the mobile station apparatus and, since the downlink control channel PDCCH is basically monitored in only one CC while the DRX control is performed, the power consumption may be reduced as compared to the case of monitoring in all the CCs. The mobile station apparatus periodically measures the wireless qualities of the connected base station apparatus and other base station apparatuses even in the CCs in which no reception processing is executed. The need to perform this wireless link quality measurement is eliminated, leading to the reduction of the power consumption.

Although the DRX parameters are common to all the CCs in this embodiment, the DRX parameters may be different for each CC. The effective period is set for each CC and, therefore, no problem occurs even when the operations are individually performed.

A configuration of the mobile station apparatus is the same as that of the mobile station apparatus described with reference to FIG. 9. The configuration is made up of the wireless section 11, the transmission processing section 12, the reception processing section 13, the transmission data control section 14, the scheduling section 18, the control data extracting section 16, and the DRX control section 17. In the scheduling section 18, the operations of the control data generating section 181, the control data analyzing section 182, and the UL scheduling section 183 are the same.

The CC managing section 184 manages the setting and release of CCs. If a CC is set, the CC managing section 184 instructs the DRX control section 17 to supply electric power to the set CC processing section. The CC managing section 184 gives an instruction for stopping the power supply to the processing sections that process the expired CCs at the expiration of the effective period of CCs after DRX instructed by the base station apparatus.

The base station apparatus determines CC to be used by the mobile station apparatus and notifies the mobile station apparatus of CC to be used by the mobile station apparatus. The base station apparatus sets the DRX parameters suitable for the mobile station apparatus and notifies the mobile station apparatus of the DRX parameters and the effective periods of CCs after DRX. If the mobile station apparatus starts the intermittent reception with the specified DRX parameters and the set effective period of each CC expires, the base station apparatus releases the connection of CC. If the data destined to the mobile station apparatus is accumulated to a certain amount or more in a buffer of the base station apparatus, the base station apparatus transmits a connection message of CC to the mobile station apparatus through the CC in which the intermittent reception is performed, confirms that the continuous reception is performed in all the CCs, and transmits the data to the mobile station apparatus.

Seventh Embodiment

Although the power consumption at the time of the intermittent reception operation is reduced by performing the intermittent reception operation in one CC instead of performing the intermittent reception in all the CCs and by terminating the reception operation or releasing the connection to the base station apparatus in the other CCs in the intermittent reception operation of the second to sixth embodiments, a method of achieving the intermittent reception while allowing all the CCs to perform the intermittent reception operation will be described below.

This can be realized by individually setting the DRX parameters for CCs and setting a longer DRX interval. The currently longest DRX interval is 2.56 seconds, and setting a longer value than this interval causes CC to appear as if the reception operation is stopped. For example, the base station apparatus sets a longer interval value such as 10 seconds, 100 seconds, or 1000 seconds as the DRX interval for some CCs.

The base station apparatus notifies the mobile station apparatus of DRX parameters (such as a DRX interval, a reception-ON period of the downlink control channel PDCCH, an extension period of the reception-ON period when the downlink control channel PDCCH is received during the reception-ON period of the downlink control channel PDCCH, and a DRX start position) of each CC. When receiving the DRX parameters, the mobile station apparatus starts the DRX control from the DRX start position specified for each CC and the mobile station apparatus performs the intermittent reception operation. If the downlink control channel PDCCH is received during the reception-On period, the reception-ON period is extended in the CC in which the downlink PDCCH is received. The base station apparatus transmits data to the CC in the reception-ON period.

If it is desired to transmit a large amount of data to the mobile station apparatus, the base station apparatus sends a connection message for returning to the continuous reception to the CC in the reception-ON period of the mobile station apparatus. When receiving the message for returning to the continuous reception from the base station apparatus, the mobile station apparatus terminates the DRX operation for all the CC and returns to the continuous reception. If it is determined that the mobile station apparatus has processed the message and all the CCs have been put into the reception state, the base station apparatus transmits the data to all the CCs and the mobile station apparatus receives the data. The message for returning to the continuous reception in this case may be a message of a higher layer or may be a flag such as one bit of a lower layer such as a MAC (Medium Access Control) layer, so as to accelerate the processing.

For example, when four CCs are used for performing communication, if the base station apparatus sets the mobile station apparatus to operate with the DRX interval of 1.28 seconds in one CC, to operate with the DRX interval of 10.24 seconds in another CC, and to operate with the DRX interval of 102.4 seconds in remaining CCs, the two CCs set to 102.4 seconds are almost brought into a reception termination state and one CC performs the DRX operation longer than usual and therefore produces the same effect as terminating the reception of CC and releasing CC. This makes no difference from performing the DRX operation in one CC and, therefore, the power consumption may be reduced. The configuration of the mobile station apparatus is the same as that of the mobile station apparatus described with reference to FIG. 2.

Although the first to seventh embodiments are described with no distinction between short DRX and long DRX, the DRX control as described above may be performed from either short DRX or long DRX.

EXPLANATIONS OF REFERENCE NUMERALS

11 . . . wireless section; 12 . . . transmission processing section; 13 . . . reception processing section; 14 . . . transmission data control section; 15 . . . scheduling section; 16 . . . control data extracting section; 17 . . . DRX control section; 18 . . . scheduling section; 151 . . . control data generating section; 152 . . . control data analyzing section; 153 . . . UL scheduling section; 181 . . . control data generating section; 182 . . . control data analyzing section; 183 . . . UL scheduling section; and 184 . . . CC managing section.

The invention claimed is:

1. A mobile station apparatus connecting to a base station apparatus, the mobile station apparatus comprising:
 a control data analyzing circuitry configured or programmed to obtain a set of intermittent reception parameters from the base station apparatus; and
 a DRX control circuitry configured or programmed to apply the set of intermittent reception parameters to all of a plurality of component carriers in use by the mobile station apparatus, and perform an operation of intermittent reception including monitoring a downlink control channel on all of the plurality of component carriers,
 the set of intermittent reception parameters including:
  a first period in which the mobile station performs the monitoring, and
  a second period in which the monitoring being kept after the first period, wherein
  the DRX control circuitry keeps monitoring during the second period on all of the plurality of component carriers if receiving, during the first period, the downlink control channel destined to itself
   on plural component carriers of among the plurality of the component carriers in use by the mobile station apparatus.

2. The mobile station apparatus according to claim 1, wherein
 the DRX control circuitry keeps monitoring during the second period on all of the plurality of component carriers even if the downlink control channel destined to itself does not indicate a uplink grant.

3. The mobile station apparatus according to claim 1, wherein
 the DRX control circuitry keeps monitoring during the second period on all of the plurality of component carriers based on the receiving of the downlink control channel destined to itself but not based on whether the downlink control channel destined to itself indicating a uplink grant.

4. An intermittent reception method of a mobile station apparatus connecting to a base station apparatus, the intermittent reception method comprising:
 receiving a set of intermittent reception parameters from the base station apparatus;
 applying the set of intermittent reception parameter to all of a plurality of component carriers in use by the mobile station apparatus;
 performing an operation of intermittent reception including monitoring a downlink control channel on all of the plurality of component carriers,
 the set of intermittent reception parameters including:
  a first period in which the mobile station performs the monitoring, and
  a second period in which the monitoring being kept after the first period, wherein
  monitoring is kept during the second period on all of the plurality of component carriers if receiving, during the first period, the downlink control channel destined to itself
   on plural component carriers of among the plurality of the component carriers in use by the mobile station apparatus.

5. The mobile station apparatus according to claim 4, wherein
 the monitoring is kept during the second period on all of the plurality of component carriers even if the downlink control channel destined to itself does not indicate a uplink grant.

6. The mobile station apparatus according to claim 4, wherein
 the monitoring is kept during the second period on all of the plurality of component carriers based on the receiving of the downlink control channel destined to itself but not based on whether the downlink control channel destined to itself indicating a uplink grant.

* * * * *